Patented July 26, 1949

2,476,957

UNITED STATES PATENT OFFICE 2,476,957

PROCESS FOR PRODUCING FILMS OF CHROMATED PROTEINS ON ZINC

Abner Brenner, Chevy Chase, Md., and Robert Seegmiller and Grace E. Riddell, Washington, D. C.

No Drawing. Application October 10, 1946, Serial No. 702,348

2 Claims. (Cl. 148—6.2)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to corrosion-resistant coatings for zinc, aluminum, brass and steel, and particularly to such coatings of chromated proteins.

Metals have been protected from corrosion by several different types of coatings, such as electrodeposits, paints, chemical surface treatments, oils and waxes. The coatings of our invention occupy a position intermediate to paint coatings and chemical surface treatments. The protective value of the coating of our process is greater than that of chemical surface treatments, such as phosphate coatings or the chemical chromate dips which are applied to zinc, but is not as high as that of paint coatings. Coatings in accordance with our invention, however, are considerably less expensive than paints and are comparable to the chemical finishes in expense and ease of application.

The invention has for an object the provision of inexpensive corrosion-resistant coatings for zinc, steel, brass and aluminum. A further object is to provide such coatings which may be conveniently applied to the surface to be protected. Other objects and advantages of our invention will be apparent from the description hereinafter given.

The coatings of our invention consist of a thin coating or film of a protein (such as gelatin, albumen or casein) which has been impregnated with a chomate and hardened. Like chemical finishes, the purpose of the chromated protein film is to give protection to metal surfaces against mild corrosion and they are not suited to resist severe corrosion over as long a period as paint films. As an example, the chromated protein films applied over zinc-coated steel and exposed to the salt spray will prevent the zinc from developing white corrosion products over a period of from four days to one week, whereas unprotected zinc will develop corrosion in one day.

The basic elements of these protective films are (1) a protein film, (2) the film must be hardened, that is, rendered insoluble in water, and (3) it must contain a small amount of a chromate to act as a corrosion inhibitor. There are many methods of accomplishing these requirements, as will be shown later. The chromated protein films of our invention protect metal surfaces in a different manner than paint films. The latter protect by forming a barrier to moisture. The chromated proteins protect by containing a small amount of chromate to act as a corrosion inhibitor, that is, a passive condition of the metal surface is produced, perhaps through formation of an invisible oxide film.

The coating functions as follows: the chromate dispersed throughout the film acts as the corrosion inhibitor and is effective in the presence of moisture. The protein film acts mainly as a matrix or binder for retaining the chromate and does not, per se, have any value in protecting the metals against corrosion.

As proteins we prefer to use gelatin, egg or blood albumin and casein. Gelatin is dissolved in water with gentle heating. Albumin may be dissolved in water by stirring and with or without the addition of from 25 to 50 ml. of ammonium hydroxide ($NH_4OH$) per liter of water. The albumin solution must not be heated for this may cause coagulation. The casein is brought into water solution by stirring and the addition of 25 ml. of ammonium hydroxide ($NH_4OH$) per liter of water. In preparing these protein solutions, it is well to add from 1 to 2 grams per liter of potassium chromate ($K_2CrO_4$) to prevent the solutions from putrifying. The concentration of the protein solutions may vary from 2 to 20% by weight. The weaker solutions give thinner films, which have less corrosion resistance. The stronger solutions give thicker films, but are more viscous and hence more difficult to use. Solutions of from 10 percent to 15 percent give the optimum results.

The following examples illustrate the variety of methods by which chromated protein films may be prepared.

One-step process

The simplest method of applying the films comprises the preparation of a coating mixture in which the chromate, the hardening agent and the protein are all in one solution. In general, this is difficult of accomplishment because the chromate and the hardening agent may coagulate the protein when added to the solution. For example, if a chromic acid solution is used for hardening the films, the gelatin will coagulate. However, certain metallic dichromates, particularly dichromates of metals or radicals which form weak bases are compatible with protein solutions and will yield an insoluble film on drying. On the other hand, dichromates of metals yielding strong bases, such as potassium dichromate, while they are compatible with the protein solution, produce films on evaporation which disintegrate in the presence of water, and hence are unsatisfactory.

A casein solution, prepared as previously described, which will give a satisfactory insoluble corrosion-resistant film on drying, may be prepared in the following manner. To a 10% solution of casein there is added an ammoniacal zinc chromate. The concentration of the zinc chromate should amount to about 2% to 5% of the weight of the solution. This solution hardens on drying because the ammonia evaporates and leaves the zinc chromate in a form that coagulates the casein. The chromate which is dispersed throughout the film acts as the corrosion inhibitor.

A gelatin solution which will give an insoluble film on drying may be prepared by adding compounds such as ammonium, zinc or nickel dichromate to a 10% gelatin solution prepared as previously described. The dichromate concentration should be from 2 to 5 percent by weight of the solution. After drying, the films should be exposed to light to increase their insolubility in water. These gelatin solutions are not stable but thicken and become ropy after several days, especially if exposed to light.

Another bath composition which though not the preferred coating may be applied with some success to brass comprises 100 g./l. of egg albumin, 50 ml./l. of ammonium hydroxide, 2 g./l. of potassium chromate and 20 g./l. of zinc dichromate.

Two-step process

Instead of preparing a complete coating mixture, as in the one-step process, protective films may be formed by first dipping the metals to be protected in a protein solution and upon drying, hardening the coating by dipping in a chromate-coagulating or hardening agent. A protein solution containing from 5% to 25% by weight of protein may be prepared as previously described. The objects to be coated are dipped in the solution and are then permitted to drain and dry. The coating is then immersed in a hardening solution which simultaneously impregnates the coating with the chromate inhibitor, and then is allowed to dry without rinsing. The hardening solution may be either a chromic acid solution or certain heavy metal dichromate solutions. The chromic acid solution may vary from one-half to five percent. The lower limits of from one-half to 2 percent are preferable, however, since the stronger solutions may cause some disintegration of the protein film. Dichromates of the metals or radicals which form weak bases and those giving solutions which hydrolyze are the best to use for the dichromate hardening solution. Such dichromates are, for example, those of zinc, iron or nickel. Zinc dichromate solutions used for hardening may vary from 1 to 10 percent in concentration. The time of immersion of the metallic object in the chromate hardening solution may vary from one-half minute to 3 minutes. In general, the two-step process produces a film of higher protective value than the one-step process.

In the treatment of aluminum, optimum results are obtained when the metallic objects to be protected are dipped in a bath prepared as above, comprising 100 g./l. of casein, 25 ml./l. of ammonium hydroxide and 2 g./l. of potassium chromate. After drying, the coated metal is dipped in a 5 percent zinc dichromate solution for 2 minutes and allowed to dry. Though not the preferred coating, this bath may also be used with steel, zinc, and brass.

For the best results in the treatment of zinc, brass and steel, the following is recommended. The metals to be coated are immersed in a bath prepared as previously described, having 100 g./l. of egg albumin, 50 ml./l. of ammonium hydroxide and 2 g./l. of potassium chromate. After drying the treated metals are dipped for 30 seconds in a two percent solution of $CrO_3$ and allowed to dry. Though not as effective, the same procedure may be applied to aluminum.

While we prefer to use the metallic chromates, soluble organic amine chromates may also be used in hardening solutions. Some of the amines which may be used are diethylene triamine and tetraethanol ammonium hydroxide.

Three-step process

The one and two-step processes are generally to be preferred, however, the protective films may also be applied in a three-step process. The objects to be coated are dipped in protein solutions prepared in the usual manner and permitted to dry. Upon drying, the film is hardened by dipping in a solution of reagents that will coagulate the protein, for example, into solutions of formaldehyde, tannins, chrome alum, or in the case of casein, into a solution of certain metallic salts such as zinc, nickel, iron, or chromium.

After hardening treatment, the film is impregnated with chromate from a dichromate solution, such as those mentioned in the two-step process.

Other variations

Another method of producing protective films of this type is as follows.

A protein solution is prepared in the usual manner. This may then be tumbled in a ball mill with an insoluble chromate to produce what is essentially a water paint. Objects to be coated are dipped in this water paint and after drying are hardened by dipping in a solution of an organic reagent, in a chromic acid solution, or in a metallic dichromate solution of the type previously mentioned. Insoluble chromates which may be used in this process are commercial zinc chromate, strontium chromate, barium chromate and the insoluble chromates of organic amines related to the fatty acids, for example, lorol amines, and hexadecylamine chromates. The zinc chromate produced the best results, particularly when used in a casein solution in the ratio of one part of casein to three parts of zinc chromate and seven parts of water.

Since the protein solutions are aqueous solutions, other aqueous dispersions can be combined with them to produce special effects. For example, a casein solution made up with ammoniacal zinc chromate, as in the one-step process, can be mixed with either an aqueous wax emulsion, or an emulsion of rubber latex. Mixtures of this type will yield films containing an appreciable amount of wax or rubber. These films, while they give no greater protection from corrosion than unmodified films, do provide greater resistance to abrasion and in the case of the wax additions, impart anti-friction properties.

When freshly prepared and hardened, protein films are insoluble in water. When exposed to light some film, particularly those containing gelatin, become harder and more insoluble. Treatment with light is therefore sometimes an advantage although not a necessity. For ordinary purposes, however, the films will receive enough light to produce the maximum insolubility.

The thickness of the films produced by any of the above described processes increases with the concentration of the protein in the solution. Using 10 percent solutions of the protein, the thickness of the film obtained with egg albumin is 0.00005 to 0.00015 inch, with casein 0.0001 to 0.0004 inch and with gelatin, about 0.0002 inch. Chemical films are only a few hundred-thousandths of an inch thick and thus are not as resistant to abrasion as the protein films.

The chromated protein films are yellow and transparent so that the coated object retains its metallic appearance. The film coatings are too hard to be scratched by the finger nail and have good adherence to the metal. Bending of the metal will not crack off the film. The film may be heated to 150° C. without damage. Zinc chromate films, produced chemically by dipping, lose a large proportion of their protective value upon heating to 100° C. for one hour.

The films have a protective value for zinc, steel, aluminum and brass surfaces, but have little or no protective value for magnesium or copper surfaces. The type of protein film and type of hardening treatment giving the optimum protection from corrosion varies with the type of metal surface. Certain protein films on aluminum are superior to anodized aluminum surfaces. They have been subjected to the salt spray for as much as four weeks without the protein film materially breaking down.

On brass, certain protein films are superior to the non-pigmented nitrocellulose lacquer films. On this surface the protein films withstand a week of salt spray exposure.

Applied over zinc, these films give as much as or more protection against corrosion than the proprietary chromate dips now used which involve dipping the zinc surfaces into a modified solution of chromic acid. These latter dips remove a certain amount of the zinc in forming the protective film, whereas the protein solution films do not remove any zinc.

The chromated protein films afford more protection to zinc, aluminum, and brass surfaces than to steel. But these films will protect steel in the salt spray for more than a day and will keep steel from rusting for months under mild conditions, such as indoors and in storage. Exposure tests indicate these films are much superior to inhibited oil films or phosphate films which rust within a few hours when exposed to salt spray and within a week when exposed to ordinary atmospheric conditions.

It is obvious to one skilled in the art that other variations may be made in the application of our invention without departing from the scope thereof.

Having described our invention, what we claim is:

1. A method for coating zinc to prevent corrosion thereof consisting of dipping the zinc to be protected in an aqueous solution of protein, the protein content being from 5% to 25% by weight of the solution, to form a film coating, drying the coating thus formed, and then dipping the coated zinc in an aqueous solution of zinc dichromate, the dichromate content being from 1% to 10% of the solution, to harden the protein film.

2. As an article of manufacture, zinc in commercial form, a film surrounding and encasing said zinc, said film consisting of a dichromate of a metal yielding weak bases, dispersed in a hardened normally water soluble protein.

ABNER BRENNER.
ROBERT SEEGMILLER.
GRACE E. RIDDELL.

REFERENCES CITED

The following references are of record in the file of this patent:

UNITED STATES PATENTS

| Number    | Name     | Date          |
|-----------|----------|---------------|
| 2,163,984 | Petkovic | June 27, 1939 |
| 2,228,836 | McQuaid  | Jan. 14, 1941 |

FOREIGN PATENTS

| Number  | Country | Date          |
|---------|---------|---------------|
| 658,463 | Germany | Apr. 1, 1938  |

OTHER REFERENCES

Science News Letter, April 17, 1948, page 253.